US010354251B1

(12) United States Patent
Gailloux et al.

(10) Patent No.: US 10,354,251 B1
(45) Date of Patent: Jul. 16, 2019

(54) ASSIGNING RISK LEVELS TO ELECTRONIC COMMERCE TRANSACTIONS

(71) Applicant: Sprint Communications Company L.P., Overland Park, KS (US)

(72) Inventors: Mike A. Gailloux, Overland Park, KS (US); Lauren Ricardo King, Somerset, NJ (US)

(73) Assignee: Sprint Communications Company L.P., Overland Park, KS (US)

( * ) Notice: Subject to any disclaimer, the term of this patent is extended or adjusted under 35 U.S.C. 154(b) by 1250 days.

(21) Appl. No.: 13/972,619

(22) Filed: Aug. 21, 2013

Related U.S. Application Data (63) Continuation of application No. 13/952,322, filed on Jul. 26, 2013, now abandoned.

(51) Int. Cl.
*G06Q 40/00* (2012.01)
*G06Q 20/40* (2012.01)

(52) U.S. Cl.
CPC ............................... *G06Q 20/4016* (2013.01)

(58) Field of Classification Search
CPC ......... G06Q 20/04; G06Q 20/12; G06Q 20/32
See application file for complete search history.

(56) References Cited

U.S. PATENT DOCUMENTS

| | | | |
|---|---|---|---|
| 5,220,593 A | 6/1993 | Zicker et al. | |
| 5,335,265 A | 8/1994 | Cooper et al. | |
| 5,679,940 A * | 10/1997 | Templeton | G06Q 20/04 235/375 |
| 5,907,602 A | 5/1999 | Peel et al. | |
| 5,950,121 A | 9/1999 | Kaminsky et al. | |

(Continued)

FOREIGN PATENT DOCUMENTS

EP 0981068 1/1999

OTHER PUBLICATIONS

Opara, Emmanuuel (Online credit card processing models: Critical issues to consider by small merchants, https://www.researchgate.net/figure/Client-server-architecture-of-Payment-Gateway_fig3_266567853, Jan. 2003) (Year: 2003).*

(Continued)

*Primary Examiner* — Bruce I Ebersman
*Assistant Examiner* — Mark H Gaw (57) ABSTRACT

Systems, methods, and computer readable media for identifying irregular electronic commerce transactions are provided. A server is configured to receive a request for a risk level associated with electronic commerce transactions. The sever accesses a communications account associated with a user who initiated the electronic commerce transaction. The user may initiate the electronic commerce transaction on a wireless device. The server accesses the communication patterns, payment patterns, and voice patterns of the communications account for the wireless device. If changes in the communication, payment, or voice patterns of wireless device are detected, the server assigns a high or medium risk level to the electronic commerce transaction. If the server is unable to identify the pattern change, the assigned risk level of the electronic commerce transaction is low. The assigned risk levels are received by a transaction processor and may influence a rate charged for processing the electronic commerce transaction.

6 Claims, 6 Drawing Sheets

(56) References Cited

U.S. PATENT DOCUMENTS

| | | | |
|---|---|---|---|
| 5,960,338 | A | 9/1999 | Foti |
| 6,181,925 | B1 | 1/2001 | Kaminsky et al. |
| 6,185,416 | B1 | 2/2001 | Radokas et al. |
| 6,208,720 | B1 | 3/2001 | Curtis et al. |
| 6,212,266 | B1 | 4/2001 | Busuioc |
| 6,219,538 | B1 | 4/2001 | Kaminsky et al. |
| 6,501,380 | B1 | 12/2002 | Jakobsson |
| 6,662,023 | B1 | 12/2003 | Helle |
| 7,236,954 | B1 | 6/2007 | Marchand et al. |
| 7,266,849 | B1 | 9/2007 | Gregory et al. |
| 7,567,795 | B1 | 7/2009 | Champion et al. |
| 7,620,596 | B2 | 11/2009 | Knudson et al. |
| 8,145,561 | B1 | 3/2012 | Zhu |
| 8,386,386 | B1 | 2/2013 | Zhu |
| 2003/0002639 | A1* | 1/2003 | Huie ............... 379/114.27 |
| 2003/0236872 | A1* | 12/2003 | Atkinson ............. G06Q 20/04 709/223 |
| 2004/0249866 | A1 | 12/2004 | Chen et al. |
| 2005/0166854 | A1 | 8/2005 | Huang |
| 2005/0179519 | A1 | 8/2005 | Kawamura |
| 2005/0280557 | A1 | 12/2005 | Jha |
| 2006/0009214 | A1 | 1/2006 | Cardina |
| 2007/0016676 | A1 | 1/2007 | Breuer |
| 2007/0032227 | A1 | 2/2007 | Chen |
| 2007/0035390 | A1 | 2/2007 | Thomas |
| 2007/0038680 | A1 | 2/2007 | Casey |
| 2007/0124246 | A1 | 5/2007 | Lawyer et al. |
| 2007/0190995 | A1 | 8/2007 | Wang et al. |
| 2008/0127313 | A1 | 5/2008 | Payne et al. |
| 2008/0208760 | A1* | 8/2008 | Keithley ............... 705/75 |
| 2008/0233919 | A1 | 9/2008 | Kenney |
| 2008/0238614 | A1 | 10/2008 | Delia et al. |
| 2008/0276326 | A1 | 11/2008 | Bhansali et al. |
| 2008/0288393 | A1* | 11/2008 | Toms ............... G06Q 40/02 705/38 |
| 2009/0094618 | A1 | 4/2009 | Huntsman |
| 2009/0129573 | A1 | 5/2009 | Gavan |
| 2009/0164365 | A1* | 6/2009 | Dragt et al. ............... 705/38 |
| 2009/0247122 | A1 | 10/2009 | Fitzgerald et al. |
| 2009/0249443 | A1 | 10/2009 | Fitzgerald et al. |
| 2009/0251282 | A1 | 10/2009 | Fitzgerald et al. |
| 2009/0253410 | A1 | 10/2009 | Fitzgerald et al. |
| 2009/0287496 | A1 | 11/2009 | Choi |
| 2009/0300771 | A1 | 12/2009 | Bhansali et al. |
| 2010/0219979 | A1 | 2/2010 | Ordogh |
| 2010/0134275 | A1 | 6/2010 | Fitzgerald et al. |
| 2010/0138296 | A1 | 6/2010 | Fitzgerald et al. |
| 2010/0216429 | A1 | 8/2010 | Mahajan |
| 2010/0293065 | A1* | 11/2010 | Brody et al. ............... 705/26 |
| 2011/0076986 | A1 | 3/2011 | Glendinning et al. |
| 2011/0145927 | A1 | 6/2011 | Hubner et al. |
| 2012/0284187 | A1* | 11/2012 | Hammad et al. ............ 705/44 |
| 2014/0067684 | A1* | 3/2014 | Carlson et al. ............ 705/44 |
| 2014/0222678 | A1* | 8/2014 | Sheets ............ G06Q 20/40145 705/44 |

OTHER PUBLICATIONS

U.S. Appl. No. 12/706,864 File History.
U.S. Appl. No. 12/775,579 File History.
U.S. Appl. No. 12/839,893 File History.
U.S. Appl. No. 12/940,215 File History.
U.S. Appl. No. 12/940,194 File History.
U.S. Appl. No. 12/905,205 File History.
U.S. Appl. No. 12/986,708 File History.
First Action interview Pre-Interview Communication dated Aug. 2, 2012 in U.S. Appl. No. 12/775,579.
Burge, Peter, et al,. Fraud Detection and Management in Mobile Telecommunications Networks., Royal Holloway University of London, England, 1997.
Fawcett, Tom, et al., Adaptive Fraud Detection, NYNEX Science and Technology, White Plains, NY., 1997.
Moreau, Yves, et al., A hybrid system for fraud detection in mobile communications., 1999.
Britos, Paola, et al., Unusual Changes of Consumption Detection in Mobile Phone Users, Software & Knowledge Engineering Center Graduate School, Buenos Aires Institute of Technology, 2006.
Gopal, Rupesh, K., et al., A Rule-based Approach for Anomaly Detection in Subscriber Usage Pattern, 2007.
Preinterview Office Action in U.S. Appl. No. 12/940,194, dated Oct. 1, 2012.
Preinterview First Action interview dated Nov. 2, 2012 in U.S. Appl. No. 13/604,185.
First Action Interview dated Apr. 11, 2012 U.S. Appl. No. 12/905,205.
First Action Interview Office Action dated Jan. 2, 2013 in U.S. Appl. No. 13/604,185.
U.S. Appl. No. 10/151,593 File History.
Crossman, Penny, "Payments & Cards 12.5% of E-commerce Transactions Will Be Mobile by the End of 2013, Gartner Predicts", Bank Systems & Technology, Sep. 20, 2010.
"Microstrategy, Enterprise Software Platforms", MicroStrategy, Inc. Available at: http://www.microstrategy.com/mobile/transactions/ (2013).
"Mobile Devices and Organizational Security Risk", Verizon, Available at: http://business.verizonwireless.com/content/dam/b2b/resources/wp_mobile-devices-and-organizational-security-risk_en_xg.pdt (2010).
U.S. Appl. No. 11/757,255 File History.
"Mobiie Credit Card Processing", OrbitalPay, Available at: http://orbitalpay.com/mobile_credit_card_processing.html (2013).
"Secure Transactions On-the-Go with Mobile Credit Card Processing", BluePay, Available at: http://www.bluepay.com/processing-services/solutions/mobile-processing (2013).
"Risk Management Services", Visa, Available at http://corporate.visa.com/about-visa/technology/risk-management-services.shtml (2013).
"Mobile Transaction Processing Solutions", MphasiS, Available at: http://www.mphasis.com/services/payments-solutions/mobile-transaction-processing-solutions.asp (2012).
"Mobile Processing Solutions", eProcessing Network, LLC, Available at: http://www.eprocessingnetwork.com/mobile.html (2013).

* cited by examiner

ASSIGNING RISK LEVELS TO ELECTRONIC COMMERCE TRANSACTIONS

PRIORITY

This patent is a continuation of U.S. Ser. No. 13/952,322, filed 26 Jul. 2013, which is incorporated by reference in its entirety.

CROSS-REFERENCE TO RELATED CASES

This patent is related by subject matter to the following: U.S. patent application Ser. No. 12/706,864 "Telecom Fraud Detection Using Social Pattern" filed Feb. 17, 2010, U.S. Pat. No. 8,396,451, issued Mar. 12, 2013; U.S. patent application Ser. No. 12/775,579 "Communications-Service Fraud Detection Using Special Social Connection" filed May 7, 2010, U.S. Pat. No. 8,413,234, issued Apr. 2, 2013; U.S. patent application Ser. No. 12/839,893 "Telecom-Fraud Detection Using Device-Location Information" filed Jul. 20, 2010, U.S. Pat. No. 8,655,314, issued Feb. 18, 2014; U.S. patent application Ser. No. 12/940,215 "Using Communications Records To Detect Unauthorized Use Of Telecommunication Services" filed Nov. 5, 2010, U.S. Pat. No. 8,359,006, issued Jan. 22, 2013; U.S. patent application Ser. No. 12/940,194 "Using Communications Records To Detect Unauthorized Use Of Telecommunication Services" filed Nov. 5, 2010, U.S. Pat. No. 8,463,237, issued Jul. 11, 2013; U.S. patent application Ser. No. 12/905,205 "Reducing Mobile-Phone Fraud" filed Oct. 15, 2010, U.S. Pat. No. 8,295,812; U.S. patent application Ser. No. 12/986,708 "Telecom-Fraud Detection Using Device-Location Information" filed Jan. 7, 2011, U.S. Pat. No. 8,483,663, issued Jul. 9, 2013; U.S. patent application Ser. No. 12/348,378 "Phone usage pattern as credit card fraud detection trigger" filed Jan. 5, 2009, U.S. Pat. No. 8,145,561 issued Mar. 27, 2012; and U.S. Pat. No. 8,386,386 entitled "Phone usage pattern as credit card fraud detection trigger" issued Feb. 26, 2013, each of which is incorporated by reference in its entirety.

SUMMARY

Embodiments of the invention are defined by the claims below, not this summary. A high-level overview of various aspects of the invention are provided here for that reason, to provide an overview of the disclosure, and to introduce a selection of concepts that are further described in the detailed description section below. This summary is not intended to identify key features or essential features of the claimed subject matter, nor is it intended to be used as an aid in isolation to determine the scope of the claimed subject matter.

At a high level, the subject matter described herein includes ways of identifying irregular electronic commerce transactions. A transaction processor may query a server on a telecommunications network for a risk level of electronic commerce transactions initiated by the user of the telecommunications network. The server may assign risk levels to the electronic commerce transactions. The risk levels may be based on an analysis of a communications account. The server may analyze the location and payment history for the user who initiated the electronic commerce transactions. The transaction processor (e.g., merchant or card issuer) may receive the risk levels assigned to electronic commerce transactions from the telecommunications server on a carrier's network. In some embodiments, the risk level may be based on a combination of merchant payment history or customer payment history and merchant reviews.

BRIEF DESCRIPTION OF THE DRAWINGS

Illustrative embodiments of the present invention are described in detail below with reference to the attached drawing figures, wherein.

DETAILED DESCRIPTION

The subject matter of this patent is described with specificity herein to meet statutory requirements. But the description itself is not intended to necessarily limit the scope of claims. Rather, the claimed subject matter might be embodied in other ways to include different steps or combinations of steps similar to the ones described in this document, in conjunction with other present or future technologies. Terms should not be interpreted as implying any particular order among or between various steps herein disclosed unless and except when the order of individual steps is explicitly stated.

As used herein, "electronic commerce transaction" may include a purchase transaction, a return transaction, a reward transaction or any other commercial transaction between a user of a wireless device and a merchant.

Embodiments of the invention are directed to identifying irregular electronic commerce transactions. The electronic commerce transaction may be initiated by a user. In some embodiments, the use initiates electronic commerce transactions via a plastic card at point of sale, digital payments made through a user's wireless device (e.g., tap-n-go), or online at a computing terminal. To reduce the potential for fraud, a transaction processor that identifies a card-not-present scenario may require additional levels of identity verification (e.g., receiving a pass code from the customer) before processing the transaction. Additionally, some transaction processors may request a risk level for the electronic commerce transactions from a telecommunications carrier associated with the user's wireless device. For instance, the transaction processor may issue a risk level request to a server on the telecommunications network of the wireless device. The server may access customer information (e.g., payment methods, location history, or communication preferences) that are analyzed to assign a risk level to the electronic commerce transaction. The assigned risk levels may be used to influence interchange fees associated with the electronic commerce transaction.

Accordingly, electronic commerce transactions may be completed by the transaction processor after receiving an appropriate processing fee. The processing fee may vary based on risk levels assigned by the server on the wireless telecommunication network. As a user repeatedly employs mobile shopping on a wireless device, the risk level for the user is updated based on feedback received from merchants, payment preferences specified by the user, and frequency of payment disputes with the user.

Throughout the description of the embodiments of the invention, several acronyms and shorthand notations are used to aid the understanding of certain concepts pertaining to the associated system and services. These acronyms and shorthand notations are intended to help provide an easy methodology of communicating the ideas expressed herein and are not meant to limit the scope of the embodiments of the invention. The following is a list of these acronyms:

- 3G Third Generation
- 4G Fourth Generation
- CDMA Code Division Multiple Access
- CD-ROM Compact Disc-Read Only Memory
- DVD Digital Versatile Discs
- EEPROM Electronically Erasable Programmable Read Only Memory
- GPRS General Packet Radio Service
- GSM Groupe Special Mobile
- I/O Input/Output
- LTE Long Term Evolution
- OSGI Open Service Gateway Initiative
- PDA Personal Data Assistant
- RAM Random Access Memory
- ROM Read Only Memory
- TDMA Time Division Multiple Access
- Wi-Fi Wireless Fidelity
- WiMAX Worldwide Interoperability for Microwave Access Embodiments of the technology may be embodied as, among other things: a method, system, computer-program product, or set of instructions embodied on one or more computer-readable media. The embodiments may take the form of a hardware embodiment, a software embodiment, or an embodiment combining software and hardware. In one embodiment, the invention takes the form of a computer-program product that includes computer-useable instructions embodied on one or more computer-readable media.

The computer readable media include computer-storage media and communication media. Computer-readable media includes both volatile and nonvolatile media, removable and nonremovable media, and contemplate media readable by a database, a switch, and various other network devices. Examples of stored information include computer-useable instructions, data structures, program modules, and other data representations. Computer-storage media includes RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. Communication media includes technologies that may store data momentarily, temporarily, or permanently.

A computer system may initiate the electronic commerce transaction. In some embodiments, the wireless device may have a secure element that stores credit credentials for the user. A transaction processor receives transaction details, and requests a risk level for the electronic commerce transaction. The computer system may be a client device, such as a personal computer, PDA, smartphone, e-book, tablet, or wireless device. The secure element in the computer system may be configured to provide the credit credential or other personal credentials when initiating the electronic commerce transaction.

Figure 1:
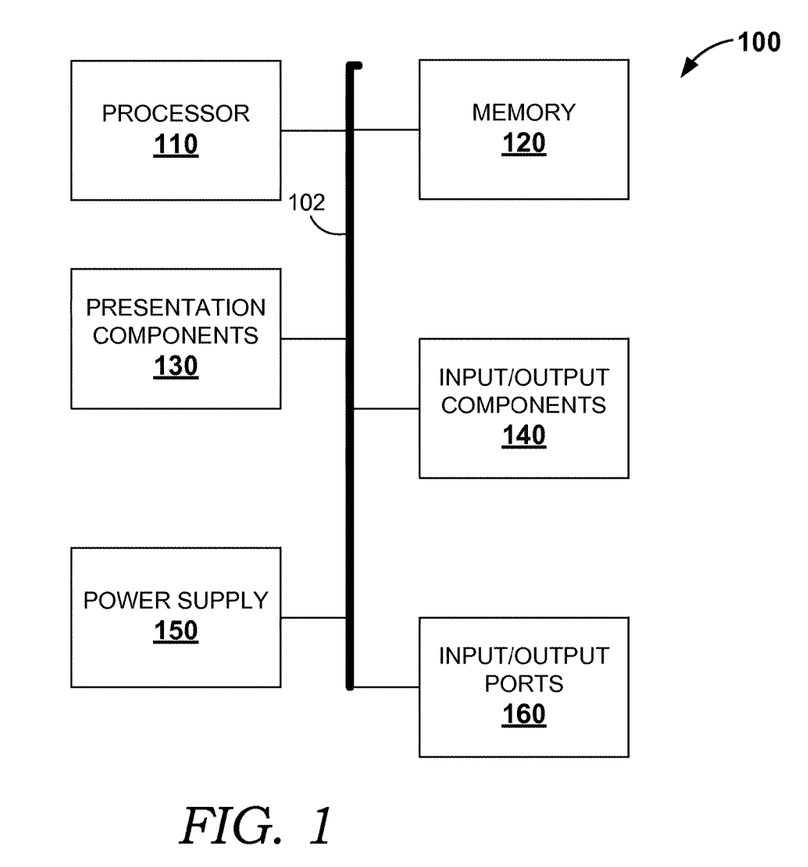
FIG. 1 is a block diagram that illustrates an exemplary operating environment in accordance with an embodiment of the invention.

FIG. 1 is a block diagram that illustrates an exemplary operating environment 100 in accordance with an embodiment of the invention. The computer system 100 is but one example of a suitable environment and is not intended to suggest any limitation as to the scope of use or functionality of the embodiments of the invention. Neither should computer system 100 be interpreted as having any particular dependency or requirement relating to any one or combination of modules or other components illustrated.

The computer system includes a bus 102 that directly or indirectly couples the following components: one or more processors 110, memory 120, one or more presentation components 130, input/output (I/O) components 140, I/O ports 160, and an illustrative power supply 150. Bus 102 represents what may be one or more buses (such as an address bus, data bus, or combination thereof). Although the various blocks of FIG. 1 are shown with lines for the sake of clarity, in reality, delineating various modules is not so clear, and metaphorically, the lines would more accurately be grey and fuzzy. For example, one may consider presentation components 130, such as a display screen, to be an I/O component 140. Also, processors 110 have memory. The inventors hereof recognize that such is the nature of the art, and reiterate that the diagram of FIG. 1 is merely illustrative of an exemplary wireless device that can be used in connection with one or more embodiments.

Computer system 100 typically includes a variety of memories 120 (e.g., computer-readable media). The memories 120 may include a secure element that stores personal and credit credentials for a user of the wireless device. The personal information may include authentication codes defined by the user of the wireless device. By way of example, and not limitation, memories 120 may comprise Random Access Memory (RAM); Read Only Memory (ROM); Electronically Erasable Programmable Read Only Memory (EEPROM); flash memory or other memory technologies; CD-ROM, DVD or other optical or holographic media; and magnetic cassettes, magnetic tape, magnetic disk storage or other magnetic storage devices.

Computer system 100 includes one or more processors 110 that read data from various entities such as memory 120 or I/O components 140. The processors 110 are used to initiate electronic commerce transactions with merchants. The processors 110 may generate an entry display where the user enters an authentication code in response to a dialog from a server on the telecommunications network for the wireless device.

Memory 120 includes computer-storage media in the form of volatile and/or nonvolatile memory. Memory 120 may be removable, non-removable, or a combination thereof. Exemplary devices for memory 120 include solid-state memory, hard drives, optical-disc drives, etc.

Presentation components 130 present data indications to a user or other device. Exemplary presentation components 130 include a display screen, speaker, vibrating module, etc. I/O ports 160 allow computer system 100 to be logically coupled to other devices including I/O components 140, some of which may be built in. Illustrative components include a keyboard, microphone, cursor or focus-movement buttons, satellite device, touch pad or touch screen, scanner, etc.

As one of ordinary skill in the art will appreciate, the inner workings of even an unsophisticated mobile device can constitute thousands of components, instructions, and the like. As previously discussed, the ability to draw distinct lines is nearly impossible because of the interoperability of many of those components. A block diagram representing interaction of certain components of the computer system according to embodiments of the invention is depicted in greatly simplified form and will be described below. More specifically, this diagram represents the internal constitution of a computing system that initiates the electronic commerce transaction.

In one embodiment, a computer system is configured to provide a risk level for electronic commerce transactions. The computer system includes a transaction processor, a communications account database, and a telecommunications server. The telecommunications server is configured to access the communications account for a user who initiates the electronic commerce transactions. The server analyzes the communication account and compares personal information included in the electronic commerce transactions with stored personal information in the communication account. The server may detect changes in location patterns, payment patterns, or communication patterns that impact a risk level assigned to electronic commerce transactions performed by the wireless device. The server provides the risk level assigned to an electronic commerce transaction based on, among other things, payment type and account status. The transaction processor receives the risk level and determines a fee associated with processing the transaction that considers the risk level.

Figure 2:
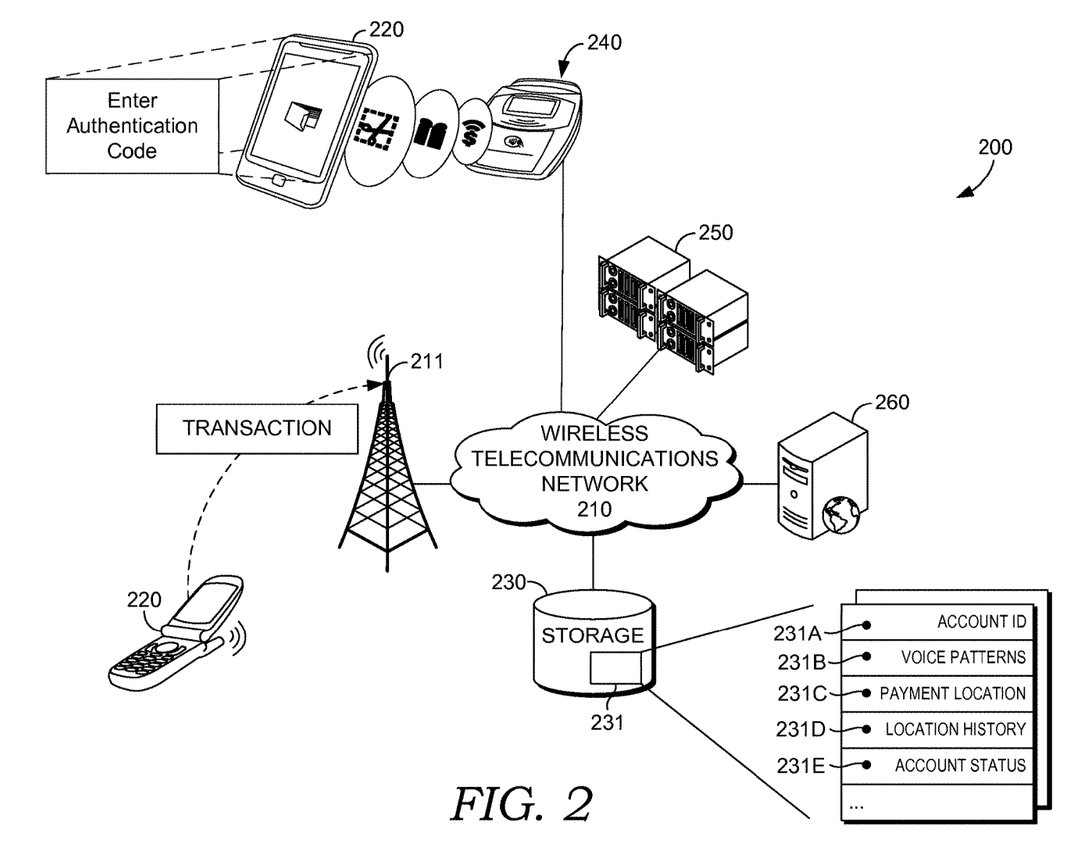
FIG. 2 is a network diagram that illustrates an exemplary transaction processor in accordance with an embodiment of the invention.

FIG. 2 is a network diagram that illustrates an exemplary transaction processor 250 in accordance with an embodiment of the invention. The telecommunication system 200 has one or more transaction processors 250, in at least one embodiment, communicatively connected to the wireless telecommunications network 210, one or more telecommunication servers 260, and one or more point of sale devices 240. The wireless telecommunication network 210 also connects the communication account database 230 and wireless devices 220. The transaction processors 250 may communicate with the telecommunications servers 260 to identify irregular electronic commerce transactions initiated by the wireless devices 220.

The wireless telecommunication network 210 connects the wireless devices 220, the communications database 230, the point-of-sale devices 240, the transaction processors 250, and the telecommunications server 260. The wireless telecommunication network 210 may include short range wireless communications networks (e.g., Bluetooth, near field communication, or infrared). Wireless telecommunications network 210 is capable of communicating over various technologies, such as CDMA, GPRS, GSM, and WiMAX. The wireless telecommunication network 210 may facilitate both short-range and long-range communications.

Short-range wireless communications may use wireless local area network (WLAN) (e.g., Wi-Fi™). Various wireless protocols and standards may be used to communicate short-range signals, such as 802.11a, 802.11b, 802.11g, 802.11n, etc. Short-range signaling, as used herein, does not include wireless communication technologies that are used for communication with a base transceiver station (BTS) or other type of cell tower, such as CDMA, GPRS, TDMA, GSM, WIMAX, LTE, 3G, 4G, etc. These wireless communication technologies are used for long-range communications.

Various components depicted in operating environment 110 communicate by way of wireless telecommunications network 210. One such component includes base stations. Base stations 211 are capable of wirelessly communicating with wireless devices 220, point-of-sale devices 240, or transaction processors 250. The base stations 211 may receive electronic commerce transactions initiated by the wireless devices 220 and transmit the transaction over the wireless telecommunications network 210 for further processing to the transaction processors 250. The transaction processor 250 receives the communication from the wireless telecommunication network 210.

The wireless devices 220 are computing devices that transmit communications over the wireless telecommunications network 210. The wireless devices 220 may include smartphones, tablets, wireless phones, personal digital assistants, or other productivity devices. The wireless devices 220 may initiate electronic commerce transactions with a merchant via the point-of-sale devices 240 (tap and go). The wireless devices 220 may also initiate electronic commerce transactions online via one or more applications executed by the wireless devices 220. A user of the wireless device may initiate the electronic commerce transactions using a credit card swipe at the point-of-sale devices 240.

Secure elements (not shown) within the wireless devices 220 may store personal and credit credentials for users of the wireless devices 220. These secure elements may store personal information like name, mailing address, billing address, age, gender, and other demographic data. The secure elements may store frequent shopper identifiers or rewards earned by the user of the wireless device. The secure elements may also store credit credentials that are used to pay for services or goods purchased by the users of the wireless devices 220. In some embodiments, the secure elements store authentication codes. The authentication codes may be selected by the user of the wireless device and may be utilized to confirm identity of the user when processing the electronic commerce transaction after determining an appropriate risk level to assign to the electronic commerce transaction. In some embodiments, the secure elements may store a record for each electronic commerce transaction initiated by the user and a risk level assigned to each electronic commerce transaction.

The communications account database 230 is a storage structure that organizes user information. The user information may provide insight to the user's communication preferences and payment preferences. The communications account database includes an account identifier 213A, voice data 231B, payment data 231C, location data 231D, and account status 231E for each account associated with the user of the wireless device 220. The account identifier 213A may be wireless device numbers issued by a carrier of the telecommunications network 210.

The voice data 231B may include tone and pitch indicators that are determined by the telecommunications server 260 after analyzing several voice communications or voice commands conducted by users of the wireless device 220. The tone may identify hurried speech, slow speech, or slurred speech as a voice pattern for the user. The pitch may identify whether the user has a low pitch (e.g., baritone), medium pitch, or high pitch (e.g., soprano or shrill) voice data 231B based on a decibel level averaged over several communications. The voice data 231B may be based on communications or commands analyzed over a specific time period. For instance, the time period may be four hours, one day, one week, one month, etc. The server 260 may utilize the voice patterns 231 to determine whether a high pitch pattern has recently changed (e.g. one-hour time period) to a low pitch.

The payment location 231C specifies whether the users of the wireless devices 220 frequently pay their wireless bills online, over-the-phone, or in-store. The payment location 231C may store the frequency associated with each location. The payment location 231C identifies a preferred location (e.g., in-store). The server 260 may process the payment location 231C and determine that the payment location has recently changed to online for a user who rarely uses online credentials but prefers in-store payment. These types of changes detected by the server 260 may trigger a high or medium risk level assessment for the electronic commerce transactions initiated by the user.

The location history 231D stores a location for the wireless device 220. The location may be a cell, a sector, a city, a zip code, a state, a geographical coordinate, or a combination thereof. The customer account database 230 may store each of the locations visited by the wireless device. The location history 231D may cluster locations (home, school, mall, grocery store, gas station, etc.) frequently visited by the user of the wireless device. When the user goes to a new location to purchase a good or service with the wireless device, the server 260 may access the location history and determine whether this is a new location. If the location is new, the risk assigned to the location may be medium or high. If the location is within the frequently visited location, the server 260 may assign the transaction a low risk. In certain embodiments, if a mismatch occurs between the location of the wireless device 220 that is currently involved in a tap-and-go transaction and the location of the merchant that is also involved in the transaction, the server 260 may assign a high risk to the transaction.

The account status 231E stores whether the user is current with the account, the number of missed payments associated with the account, and the number of days before the user corrects the missed payments. The account status 231E may also indicate that a user account is expired or in arrears. The server 260 accesses the account status 213E and may assign a high risk level to expired accounts or accounts that are overdue. On the other hand, the server may issue a low risk to the transaction when the user is current with payment of the wireless bill. The server 260 may issue the risk level assessment to the transaction processor 250.

The point-of-sale device 240 may be a cash register with a card reader, a tap-n-go terminal, or any computing device configured to read credit or payment credentials. The point-of-sale device 240 may collect product or service identifiers, cost information, and payment information from the electronic commerce transaction. The point-of-sale device 240 may transmit the collected data to the transaction processor 250 for further processing. In some embodiments, the point-of-sale device 240 communicates with the transaction processor 250 over the wireless communication network 210.

The transaction processors 250 process one or more electronic commerce transactions initiated by a user. The electronic commerce transactions may be initiated by a credit card swipe at a bar code reader, a tap-n-go terminal, or online using a web browser and an electronic checkout at an online merchant. The transaction processors 250 receive product or service information and payment credentials from the point-of-sale device 240 or a website associated with the online merchant. In turn, the transaction processors 250 may request a risk level for the transactions. The risk level may be used by the transaction processors 250 to recover processing fees for the electronic commerce transactions. The processing fees may be increased by the transaction processors 250 when the server 260 returns a high risk level or medium risk level. The processing fees may be lowered or kept the same by the transaction processor 250 when the server 260 returns a low risk level.

The telecommunications server 260 receives a request from the transaction processor 250 for a risk level of one or more electronic commerce transactions initiated by a wireless device that is provisioned by a carrier that owns or manages the telecommunications server 260. The telecommunications server 260, in turn, accesses the communications account database 230 to analyze communication patterns, voice patterns, location patterns, payment patterns, and account status before assigning a risk level to the electronic commerce transactions. The telecommunications server 260 assigns risk levels to the electronic commerce transactions and returns the risk levels to the transaction processors 250.

Accordingly, the telecommunications system is configured to identify irregular electronic commerce transactions. A telecommunications server may assign risk levels to the electronic commerce transactions, where the irregular electronic commerce transactions are assigned higher risk levels. The transaction processors may retrieve risk levels when calculating processing fees for completing the electronic commerce transactions.

In one embodiment, the wireless telecommunications network may process several communication messages associated with obtaining risk levels for the electronic commerce transactions. The user of the wireless device may be a subscriber of a carrier that manages the wireless telecommunication network. The user may authorize sharing the risk level assessments based on the information captured on the wireless telecommunications network. The risk level assessment, in some embodiments, does not impact whether the electronic commerce transaction will be completed but does impact the processing fees paid by merchants that provide the electronic commerce transactions to the transaction processors (e.g., credit issuer or money exchanger).

Figure 3A:
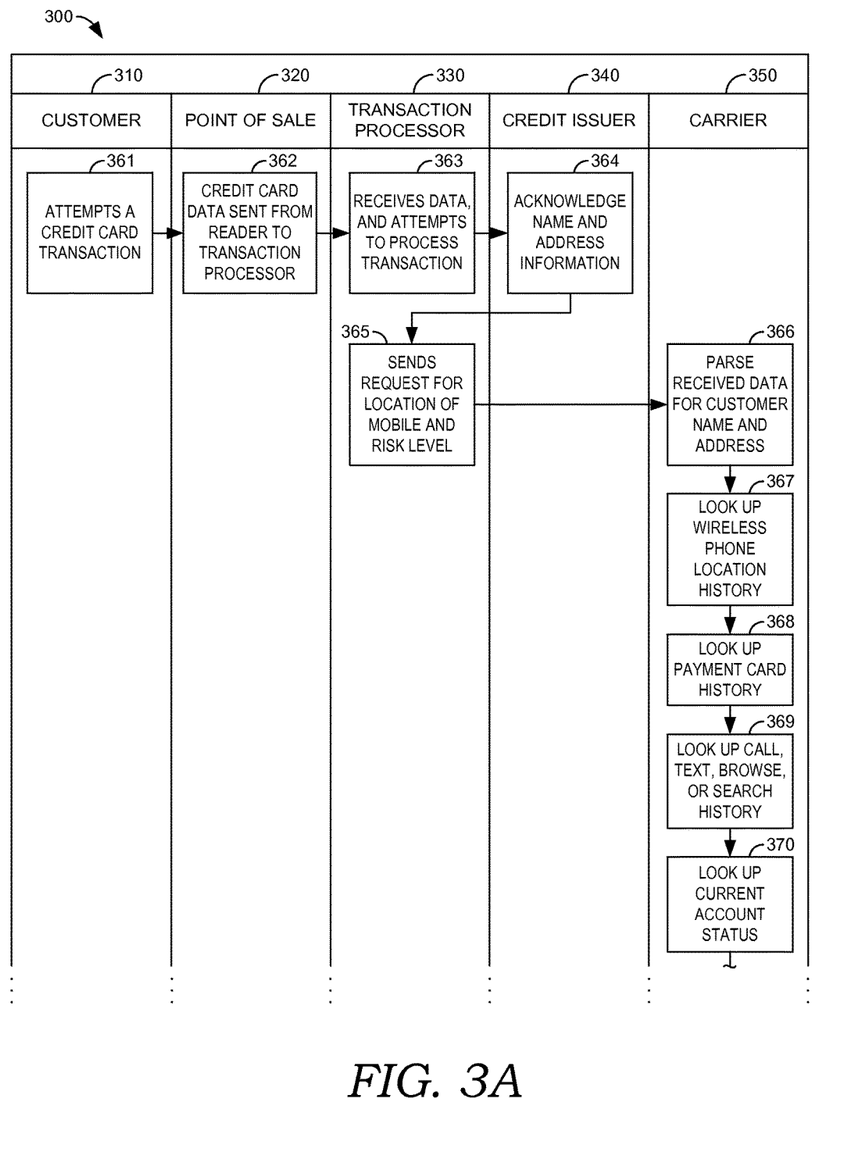
FIGS. 3A and 3B are communication diagrams that illustrate messages processed by one or more components of a transaction processing system in accordance with an embodiment of the invention.
Figure 3B:
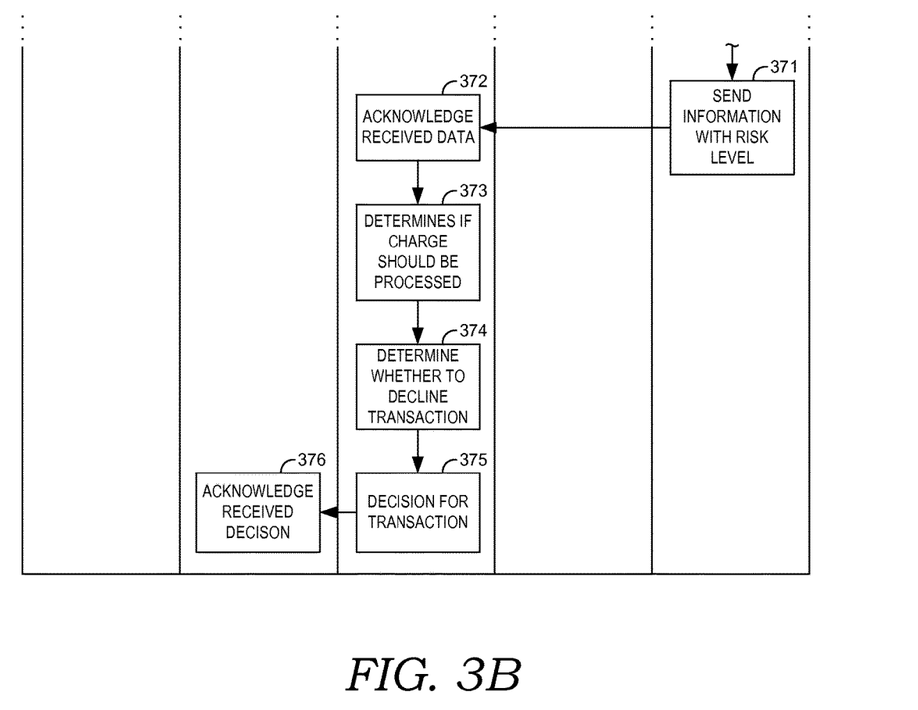

FIGS. 3A and 3B are communication diagrams that illustrate messages processed by one or more components of a transaction processing system in accordance with an embodiment of the invention. The communication messages are processed by a customer 310, point-of-sale device 320, transaction processor 330, credit issuer 340, and carrier 350.

The customer 310 may issue purchase attempt message 361 when initiating the electronic transaction. In some embodiments, the customer 310 is a subscriber of a wireless network managed by the carrier 350. The customer 310 may be employing a tap-n-go feature of the wireless device. The customer 310 may transmit the purchase attempt message 361 to the point-of-sale 320 via the wireless device.

The point-of-sale 320 receives the purchase attempt message and may issue a verification request message 362 that includes payment credentials provided by the customer 310. The point-of-sale 320 transmits the verification request message 362 to a transaction processor 330.

The transaction processor 330 receives the verification request message 362. The verification request message includes the credential information and location received from the customer 310 and merchant data (including location data) provided by the point of sale 320. In turn, the transaction processor 330 confirms the customer data and merchant data by sending a confirm message 364 to a credit card issuer 340.

The credit card issuer 340 receives the confirm message and verifies that the merchant contact, customer name, and customer address are valid. The card issuer 340 may acknowledge receipt of the merchant contact and customer name and address. The card issuer 340 sends the acknowledgment message to the transaction processor 330.

The transaction processor 340 receives an acknowledgment message and sends a risk level request message 365 to the carrier 350. The risk level request message 365 may include location obtained from the customer 310. In one embodiment, the location information may be provided by the wireless device of the customer 310.

The carrier 350 receives the risk level request message 365. The risk level request 365, in other embodiments, may also include customer name and address information extracted from the electronic commerce transaction. In still other embodiments, a wireless device identifier may be included in risk level request 365. The carrier 350 executes a parse received data message 366 to obtain the customer information or the wireless device identifier. The carrier 350 selects the customer information or wireless device identifier. The carrier 350 determines where a subscriber communication account corresponds to the customer information or wireless device identifier.

The communications account for each subscriber to the carrier 350 includes, among other things, payment history and personal information. The personal information includes mailing address, billing address, and subscriber name. The payment information may include payment type and whether a subscriber has opted-in to allow the carrier's server to use its personal information. The payment type may include cash, check, or credit card. The payment type indicates whether a subscriber normally pays the wireless bills with a credit card, check, or cash. The server may identify changes in payment type that impact risk level. For instance, a subscriber that moves from a cash payment type to a check payment type or credit payment type may trigger a high or medium risk level. Also, mismatches in the personal information may trigger a high or medium risk level.

In some embodiments, the communication account may store context information that may be aggregated over a specified period of time. The aggregated context information may provide a model of the subscriber's interaction during the specified time period. The context information may include, but is not limited to, location, Internet search or browsing history, wireless device history, or communication preferences. The aggregated location data for a subscriber may store the coordinates of places most frequently visited by the subscriber over a 36-hour or one-week period of time. The aggregated communication preferences may store the area codes or regions that a subscriber communicates with using voice, text, or video communications. For instance, frequent calls to users in Overland Park by a subscriber may cause the server to store the area code "913" and the region "Overland Park, Kansas" in the aggregated communication preferences. The aggregated Internet sites or searches may indicate that the user of the wireless device frequently searches or visits, sports, music, economic, or art content. The aggregated device history for the subscriber may store the preferences for large screens, video enabled inputs, touch screen inputs, or keyboard inputs. The aggregated context information may include account status information. The account status may be one of: current, overdue, or expired. The account status may be aggregated over the specified time period, in at least one embodiment, to determine the status at the time of the electronic commerce transaction. The aggregated context information may be used by the server to identify deviations from the preferences established by the subscriber over a long period of time (months or years.) When the server identifies a change in the established preferences during a time period that coincides with a subscriber-initiated electronic commerce transaction, the server may assign a high or medium risk level to the electronic commerce transaction. When the server is unable to detect a deviation from the established preferences during the time period that coincides with a subscriber initiated electronic commerce transaction, the server may assign a low risk level to the electronic commerce transaction.

The carrier 350, in some embodiments, may issue one or more look-up request messages 367 (location history lookup message), 368 (payment history lookup message), 369 (communication history lookup message), or 370 (account status lookup message). Based on whether deviations from aggregated account data are identified coinciding to the time period of the electronic commerce transaction, the carrier assigns an appropriate risk level. The risk level of the electronic commerce transaction may be one of: low, medium, or high. The carrier 350 transmits a risk level message 371 to the transaction processor 330 for additional processing.

The transaction processor 330 receives the risk level message 371 and issues an acknowledgment message 372 for the received data. In turn, the transaction processor 330 issues a determine processing fee message 373. The transaction processor 330 calculates a processing fee for completing the transaction based on the risk level included in the risk level message 371. At the same time of (or shortly after) determining the processing fee, the transaction processor 330 issues a determine whether to decline message 374. Upon reaching a determination for the electronic commerce transaction, the transaction processor issues a decision message 375 to the point of sale 320, which issues an acknowledgement of electronic commerce transaction decision message 376. When the transaction processor 330 approves the transaction, the decision message 375 may include the processing fee calculated by the transaction processor 330.

Accordingly, embodiments of the invention provide a telecommunication system configured to assign risk levels to electronic commerce transactions based on deviations observed in a communication account. The communications account corresponds to a wireless device that a user may have used to initiate the electronic commerce transaction. The risk levels may be used by a transaction processor to calculate a processing fee for the electronic commerce transaction.

A telecommunications network may include a risk level server according to embodiments of the invention. In some embodiments, the telecommunication server may be accessible via an application programming interface. The server may identify deviations between information provided when the electronic commerce transaction is initiated and the information aggregated from the communications account of the user that initiated the electronic commerce transaction. The deviations may include mismatches on shipping and billing addresses or other subscriber data that the merchant identifies as important data attributes that the telecommunications server should match on after extracting customer information from the electronic commerce transactions.

Figure 4:
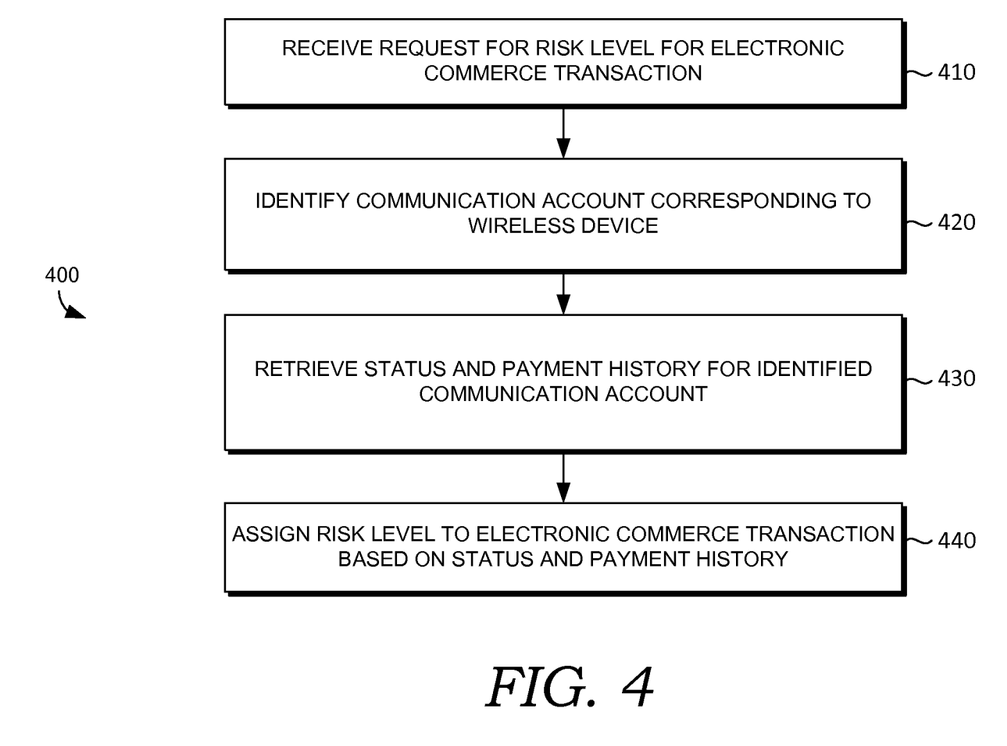
FIG. 4 is a logic diagram that illustrates a method of identifying irregular electronic commerce transactions in accordance with an embodiment of the invention.

FIG. 4 is a logic diagram that illustrates a method of identifying irregular electronic commerce transactions in accordance with an embodiment of the invention. The method may initialize when an electronic commerce transaction request is obtained by a transaction processor. In step 410, a telecommunications server may receive a request for a risk level corresponding to an electronic commerce transaction. In one embodiment, the request includes product information, customer identification, address information, and a wireless device identifier. The wireless device identifier may be an electronic serial number, IP Internet proofed address, or a wireless telephone number.

The electronic commerce transaction, in at least one embodiment, is initiated by a wireless device of a user. The wireless device may contain a secure element that stores credentials including payment information for a user of the wireless device. The secure element may be accessed by the wireless device during a tap-n-go retail interaction to provide the stored payment information.

In step 420, the telecommunications server identifies a communication account. The communication account may correspond to the wireless device. A subscriber to the communication account may authorize access to payment history and communication account status in certain embodiments of the invention. In some embodiments, subscriber authorization is explicitly obtained for each electronic commerce transaction initiated by the subscriber. The subscriber authorization may be received via a dialog box displayed to the subscriber on the wireless device. In other embodiments, a general authorization is obtained for all electronic commerce transactions initiated by the subscriber.

The subscriber authorization may be received via a dialog box provided to the user on the wireless device. Alternatively, the subscriber authorization may be received via agreements between the user and an issuer of payment credentials. The agreements may authorize an application on the wireless device to store or access some information (in the secure element or on the wireless telecommunication network) about the subscriber to reduce fraud when conducting electronic commerce transactions.

In turn, the server retrieves status data and payment history data associated with the communication account, in step 430. A risk level is assigned to the electronic commerce transaction by the server, in step 440. The server may identify deviations from aggregated communication account data for a subscriber. For instance, a mismatch in address information associated with the communication account and the address information provided when initiating the electronic commerce transaction may cause the server to increase the risk level assigned to the electronic commerce transaction.

In addition to address information, the risk level may be based on the payment history and account status. The risk level assigned by the telecommunication server may be transmitted to the transaction processor for consideration in an approval process for the electronic commerce transaction. In certain embodiments, the risk level is a numeric value that influences a rate charged to process the electronic commerce transaction. The risk level may increase based on changes in location patterns, communication patterns, or payment patterns of the wireless device.

The risk level may be based on any combinations of factors that increases or decreases the risk for the corresponding electronic commerce transactions. The following are exemplary factors and are not meant to be exhaustive. The communication account status (lost, stolen, paid-up, overdue status, turned-off), billing address, maturity of payment (e.g., how long has the user been using credit cards or cash to pay communication account bills), or whether a subscriber has paid on the mobile device with electronic payment credentials. Additional factors that may increase or decrease risk are whether digital credentials are issued and stored on the secure element, whether a secure transaction or communication (e.g., call, browse, search, text) was previously conducted on the wireless device, whether mobile checkout is used by the subscriber, and whether the location of the wireless device or address information included in the account matches customer information included in the electronic commerce transaction. Other factors that may be considered include whether the card identifier used to pay the communication account corresponding to the wireless device matches the card identifier included in the electronic commerce transaction, whether the merchant is on an IP blacklist (e.g., merchants that sell counterfeit goods or grey market goods), whether international calls are tried on the wireless device but are not authorized by the subscriber, whether preferred roaming list modifications are attempted on the wireless device, and whether preferred roaming list modifications are made on the wireless device.

Accordingly, the telecommunication server may assign risk levels based on deviation observed between customer or payment information included in the electronic commerce transaction and subscriber account information. The server may identify various patterns, e.g., voice patterns, location patterns, or purchase patterns of a subscriber. The patterns are used to establish baselines from which deviations may be assessed.

In some embodiments, a wireless device may receive dialog requests when initiating the electronic commerce transaction. The requests may solicit an authentication code. Based on whether the user enters the proper authentication code or gesture, a telecommunication server may assign a risk level to the electronic commerce transaction.

Figure 5:
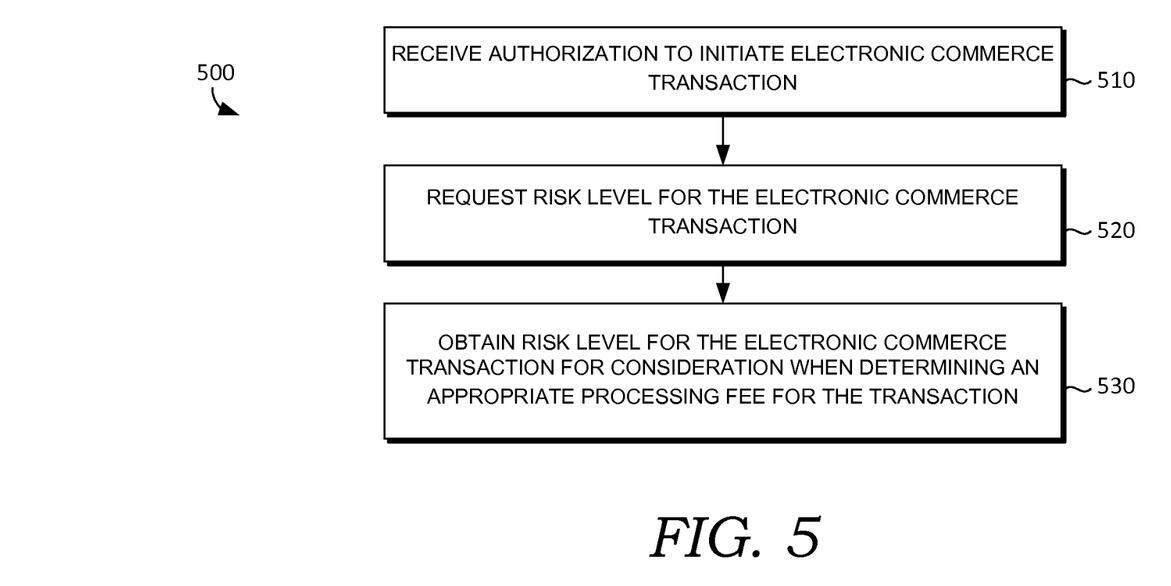
FIG. 5 is another logic diagram that illustrates a method of processing electronic commerce transactions in accordance with an embodiment of the invention.

FIG. 5 is another logic diagram that illustrates a method of processing electronic commerce transactions in accordance with an embodiment of the invention. The method may initiate when a point-of-sale device receives an electronic commerce transaction. The transaction processor may receive authorization data stored on a secure element when initiating the electronic commerce transaction, in step 510. In turn, in step 520, the transaction processor requests a risk level of the electronic commerce transaction from a server on the wireless device's communication network. The transaction processor, in step 530, obtains the risk level for the electronic commerce transaction for consideration when determining an electronic commerce transaction processing fee to charge for completing the electronic commerce transaction.

The wireless device may receive a dialog screen that requests authorization to access communication account patterns. The authorization may allow the server to verify the identity of the user before completing the transaction. The risk level provided by the server considers, among other things, communication or payment patterns associated with the communication account for the wireless device. The dialog screen, in some embodiments, presents a challenge for the user to enter an authentication code or gesture that corresponds to an authentication code or gesture stored on the secure element. If the entered authentication code or gesture fails to match the stored authentication code or gesture, the server increases the risk level for the electronic commerce transaction. But the server decreases the risk level if the entered authentication code or gesture matches the stored authentication code or gesture.

Accordingly, the transaction processor may benefit from additional data provided by the wireless telecommunication system when processing transaction that may be considered "risky" transactions. The risk level may influence percentage points included in charge back fees or processing fees. Among other considerations, the risk level considers: who is the merchant, the type of wireless service subscribed, whether additional validation is required, location of the wireless device, whether call-forwarding is set, and the age of the subscriber. The transaction processor may specify which factors are more important. This allows the telecommunication server to weigh the factors based on the importance assigned by the transaction processors.

In summary, a transaction processor may leverage communications accounts maintained by a wireless network provider. The gathered customer information for an electronic commerce transaction may be used to validate customer identifiers associated with the communication account. Moreover, the transaction processor may utilize the context provided by the wireless network provider to reduce fraud.

For instance, a customer initiates an electronic commerce transaction for one thousand dollars to purchase a television. The transaction processor may request a risk level for the transaction. The wireless network provider may include location history for a wireless device of the user that shows prior transactions within three hours of the television purchase were in the U.S. but the current transaction is associated with a location in Russia. Based on this significant deviation in location, the wireless network provider may return a high risk level to the transaction processor.

In at least one embodiment, the wireless network provider maintains a mobile risk server that accesses the communication account data based on the agreements and privacy preferences established by subscribers that opt-in for an additional level of security while performing electronic commerce transactions. In one embodiment, during each electronic commerce transaction, a dialog is presented on the user interface to inform the customer that a carrier is being contacted for fraud reduction. To entice customer approval, the transaction processor may offer discounted rates if the customer identity is verified by the carrier.

In some embodiments, the wireless device may include a secure element that provides contactless payments. These payments allow the wireless device to share credential data over radio frequency. The secure element is like a digital vault that stores important personal information for the user. In some embodiments, the wireless device may be involved in an extra authentication when risk levels are above a specific threshold (e.g., medium). The extra authentication may include requiring the user to enter an authentication code or gesture via the wireless device and transmitting the code to the telecommunications server.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure. Persons of ordinary skill in the art recognize that other ways of implementing the aforementioned can be completed without departing from the scope of the claims below. Certain features and subcombinations are of utility and may be employed without reference to other features and subcombinations and are contemplated within the scope of the claims.

The technology claimed is:

1. A telecommunications system for identifying irregular electronic commerce transactions, wherein the telecommunications system has a transaction processor configured to process payment information received from a wireless device provisioned by a telecommunications carrier, the telecommunications system comprising:
   a secure element on the wireless device, wherein the secure element provides payment information to the transaction processor and stores financial credentials for the user of the wireless device; and
   a server on a wireless network of the telecommunications carrier that receives a request from the transaction processor when the transaction processor identifies the wireless device as provisioned by the telecommunication carrier, wherein the request solicits risk level information for the user of the wireless device.

2. The system of claim 1, wherein the server analyzes current user context and historical communication account information to assign the risk level to the electronic commerce transaction.

3. The system of claim 2, wherein the risk level is one of: high, medium, or low.

4. The system of claim 2, wherein the user context includes wireless device patterns for location, communication frequency, communication type, and voice tone.

5. The system of claim 4, a time period for the user context is one of: 4 hours, 12 hours, 24 hours, n weeks, q months, z years such that n, q, and z are numbers greater than zero.

6. The system of claim 2, wherein the historical communication account information includes wireless device patterns for payment type, account status, and maturity of electronic commerce payments.

* * * * *